(12) United States Patent
Komoda et al.

(10) Patent No.: US 9,926,082 B2
(45) Date of Patent: Mar. 27, 2018

(54) VENT MEMBER, WING PANEL, AND MAIN WING FOR AIRCRAFT

(71) Applicant: MITSUBISHI AIRCRAFT CORPORATION, Aichi (JP)

(72) Inventors: Ushio Komoda, Aichi (JP); Hideto Motohashi, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 14 days.

(21) Appl. No.: 14/353,951

(22) PCT Filed: Nov. 27, 2012

(86) PCT No.: PCT/JP2012/007601
§ 371 (c)(1),
(2) Date: Apr. 24, 2014

(87) PCT Pub. No.: WO2013/099110
PCT Pub. Date: Jul. 4, 2013

(65) Prior Publication Data
US 2014/0299713 A1   Oct. 9, 2014

(30) Foreign Application Priority Data

Dec. 27, 2011   (JP) .................. 2011-285439

(51) Int. Cl.
*B64C 1/00*   (2006.01)
*B64D 37/06*   (2006.01)
(Continued)

(52) U.S. Cl.
CPC .............. *B64D 37/06* (2013.01); *B64C 3/182* (2013.01); *B64C 3/187* (2013.01); *B64C 3/26* (2013.01); *B64C 3/34* (2013.01); *B64D 37/20* (2013.01)

(58) Field of Classification Search
CPC .. B64C 3/26; B64C 1/068; B64C 3/20; B64C 1/00; B64C 3/00; B64C 2001/0081; B64C 2700/6233; B64C 1/32; B64C 1/1476
(Continued)

(56) References Cited

U.S. PATENT DOCUMENTS 1,710,350 A * 4/1929 Dewoitine .............. B64C 3/185
482/30
1,880,480 A * 10/1932 Ragsdale ............... B21D 47/04
52/692

(Continued)

FOREIGN PATENT DOCUMENTS

JP        2000-6893 A     1/2000
JP        2003-226296 A   8/2003
(Continued)

OTHER PUBLICATIONS

Michael C. Y. Niu "Airframe Structural Design" Conmilit Press Ltd., 1988, p. 259, Figs. 8, 3, and 7.
(Continued)

Primary Examiner — Assres H Woldemaryam
(74) Attorney, Agent, or Firm — Pearne & Gordon LLP

(57) ABSTRACT

An opening portion of a vent member is prevented from being blocked, and thus ventilation is reliably performed. A plurality of opening portions (40A, 40B) are formed in a single vent stringer (20), and thus even in a case where one of the opening portions (40A, 40B) is blocked, ventilation is secured by the other opening portion. At this time, since the opening portions (40A, 40B) are formed in surfaces different from each other in the vent stringer (20), a possibility that both the opening portions (40A, 40B) may be simultaneously blocked is less.

12 Claims, 5 Drawing Sheets

(51) Int. Cl.
*B64C 3/26* (2006.01)
*B64C 3/18* (2006.01)
*B64C 3/34* (2006.01)
*B64D 37/20* (2006.01)

(58) Field of Classification Search
USPC ...... 244/123.1, 123.3, 123.12, 119, 120, 121
See application file for complete search history.

(56) References Cited

U.S. PATENT DOCUMENTS

| | | | | |
|---|---|---|---|---|
| 4,802,642 A * | 2/1989 | Mangiarotty | ........... | B64C 23/00 244/130 |
| 5,262,220 A * | 11/1993 | Spriggs | ..................... | B32B 3/30 244/119 |
| 5,368,258 A * | 11/1994 | Johnson | .................. | B64C 21/06 244/130 |
| 5,944,286 A * | 8/1999 | Morris | .................... | B64C 3/187 244/131 |
| 6,050,523 A * | 4/2000 | Kraenzien | ................ | B64C 9/00 244/123.1 |
| 6,458,309 B1 * | 10/2002 | Allen | ..................... | B29C 70/446 156/197 |
| 7,093,470 B2 * | 8/2006 | El-Soudani | ............ | B21D 26/08 29/421.2 |
| 7,707,708 B2 * | 5/2010 | Douglas | ................ | B29C 33/485 29/718 |
| 8,087,614 B2 * | 1/2012 | Childs | ..................... | B64C 3/182 244/119 |
| 8,672,269 B2 * | 3/2014 | Motohashi | ............ | B64D 37/06 244/123.1 |
| 8,715,808 B2 * | 5/2014 | Roming | .................. | B64C 1/064 244/131 |
| 8,746,618 B2 | 6/2014 | Brook et al. | | |
| 8,936,164 B2 * | 1/2015 | Durney | .................. | F24J 2/5232 136/251 |
| 2006/0145010 A1 * | 7/2006 | Schmidt | .................... | B64C 3/18 244/123.8 |
| 2008/0128549 A1 * | 6/2008 | Engwall | ................ | B29C 33/485 244/119 |
| 2008/0128553 A1 * | 6/2008 | Brown | ...................... | B64C 1/26 244/124 |
| 2009/0121082 A1 * | 5/2009 | Godenzi | .................. | B64C 1/064 244/123.1 |
| 2010/0025529 A1 * | 2/2010 | Perry | .................... | B29C 65/562 244/117 R |
| 2011/0018686 A1 * | 1/2011 | Fahley | .................... | H02J 17/00 340/10.1 |
| 2011/0111183 A1 * | 5/2011 | Guzman | ............... | B29C 44/583 428/188 |
| 2012/0132748 A1 * | 5/2012 | Axford | ..................... | B64C 3/26 244/119 |
| 2012/0211603 A1 * | 8/2012 | Motohashi | ................ | B64C 1/12 244/123.1 |
| 2013/0139961 A1 * | 6/2013 | Gear | ........................ | B29C 33/68 156/247 |
| 2013/0306796 A1 * | 11/2013 | Alazraki | .................... | B64C 3/34 244/129.2 |
| 2013/0316147 A1 * | 11/2013 | Douglas | .................. | B64C 3/182 428/172 |

FOREIGN PATENT DOCUMENTS

| | | | | |
|---|---|---|---|---|
| JP | 2009-523644 A | 6/2009 | | |
| JP | 2010-274910 A | 12/2010 | | |
| WO | WO2007144563 | * | 12/2007 | ............... B64C 3/18 |
| WO | WO2009000734 | * | 12/2008 | ............... B64C 1/06 |

OTHER PUBLICATIONS

International Search Report for PCT/JP2012/007601 dated Mar. 12, 2013.
Japanese Office Action dated Feb. 10, 2016 for Japanese Patent Application No. 2011-285439.

* cited by examiner

VENT MEMBER, WING PANEL, AND MAIN WING FOR AIRCRAFT

TECHNICAL FIELD

The present invention relates to a vent member that is provided in a main wing for an aircraft, a wing panel, and the main wing for an aircraft.

BACKGROUND ART

A fuel tank is provided in the interior of a main wing for an aircraft. Further, in the main wing, a vent member is provided which introduces air from the outside into the fuel tank in order to prevent the pressure in the tank from becoming a negative pressure when fuel in the fuel tank is reduced. In addition, the vent member also functions to prevent the inside of the tank from being over-pressurized at the time of refueling on the ground. The vent member has an air introduction duct at the outside of the main wing and supplies air received from the air introduction duct into the fuel tank.

The vent member is provided so as to be continuous along a wingspan direction of the main wing on the inner peripheral surface side of a wing panel which forms the outer surface of the main wing (refer to NPL 1, for example). As such a vent member, there are a vent tube formed by mounting tubular piping on an inner peripheral surface of a main wing panel, and a vent stringer using an inner peripheral surface of a main wing panel as a portion of a flow path wall.

CITATION LIST

Non-Patent Literature

[NPL 1] Michael C. Y. Niu "Airframe Structural Design" Conmilit Press Ltd., 1988, p. 259, FIGS. 8, 3, and 7(c)

SUMMARY OF INVENTION

Technical Problem

Incidentally, in such a vent member, an opening portion is formed at one end thereof in order for external air to come in and out. In a case where, for example, waste cloth, a plastic bag, or the like is left behind in the main wing at the time of assembling work or maintenance work of the main wing, there is a possibility that the left object may block the opening portion. Then, the pressure in the fuel tank may become excessively high or low.

Therefore, as a matter of course, at the time of the work, close attention is paid such that a left object does not occur carelessly. However, nevertheless, room for a human error to occur is still left.

On the other hand, in a large aircraft, a plurality of vent members are provided in parallel, whereby even in a case where the opening portion of any vent member is blocked, a ventilation capability is secured by opening portions of other vent members.

However, in a small-scale aircraft, since a space in a main wing is also small, there is a case where it is not possible to provide a plurality of vent members.

Therefore, the present invention has been made based on such technical problems and has an object to provide a vent member in which an opening portion of the vent member is prevented from being blocked, and thus it is possible to reliably perform ventilation, a wing panel, and a main wing for an aircraft.

Solution to Problem

In order to achieve the above-described object, according to an aspect of the present invention, there is provided a vent member that is formed along an inner surface of a wing panel having an outer surface forming an outer surface of a wing and the inner surface facing an inside of the wing and is continuous in a longitudinal direction of the wing panel, wherein a plurality of opening portions are formed in the vent member.

In this manner, the plurality of opening portions are formed in the vent member, whereby a ventilation capability is prevented from becoming unable to be secured due to all the opening portions being blocked. At this time, the opening portions may be formed in surfaces different from each other in the vent member. Even if the opening portion of one surface is blocked, since the opening portion is also formed in another surface, all the opening portions of the vent member can be reliably prevented from being blocked, and thus a ventilation capability can be secured more reliably.

Here, it is preferable that the vent member include a pair of ribs which is formed integrally with the wing panel on the inner surface of the wing panel and is continuous in the longitudinal direction of the wing panel, and a cover provided so as to close a space between tip portions of the pair of ribs.

The rib and the cover may be fastened to each other in any manner. However, for example, it is possible to bring the cover into contact with a flange portion formed at the tip portion of the rib and integrally fasten the cover and the flange portion by a fastening member.

In this way, the rib and the cover can be fastened to each other further inside a wing than the wing panel.

Here, it is preferable that the ribs be formed by being cut out from the same metal matrix as the wing panel.

It is preferable that at least one of the opening portions be provided in the cover facing the inner surface of the wing panel. This is because there is a case where even if a left object blocks the opening portion, natural falling of the left object by gravity occurs.

Further, the opening portion may be formed so as to be an opening end in an end portion of the cover and be formed such that a cross-sectional area of the cover on both sides of the opening portion is gradually reduced toward a terminus of the cover.

In this manner, the opening portion is formed as an opening end, whereby it is possible to avoid stress concentration due to forming, for example, a circular opening portion in the cover.

In addition, the vent member may further include an end plate provided in proximity to the terminus of the cover so as to close a space between the tip portions of the pair of ribs.

Further, the ribs may be formed by being cut out from the same metal matrix as the wing panel.

According to another aspect of the present invention, there is provided a wing panel that has an outer surface forming an outer surface of a wing and an inner surface facing the inside of the wing, including: the vent member as described above, wherein the vent member includes a pair of ribs which is formed integrally with the wing panel on the inner surface of the wing panel and is continuous in a longitudinal direction of the wing panel, and a cover provided so as to close a space between tip portions of the pair of ribs.

In addition, according to still another aspect of the present invention, there is provided a main wing for an aircraft including; a wing panel having an outer surface forming an outer surface of a wing, and an inner surface facing the inside of the wing; and the vent member as described above.

Advantageous Effects of Invention

According to the present invention, a plurality of opening portions are formed, whereby it is possible to prevent a ventilation capability from becoming unable to be secured due to all the opening portions being blocked. At this time, the opening portions are formed in surfaces different from each other in the vent member, whereby it is possible to reliably prevent all the opening portions from being blocked.

In this way, even in a case where only one vent member can be installed, it is possible to reliably secure a ventilation capability.

Further, the opening portion is formed so as to be an opening end in an end portion of the cover, whereby it is possible to avoid stress concentration in the periphery of the opening portion when the cover is deformed as a main wing is deformed in flight.

DESCRIPTION OF EMBODIMENTS

Hereinafter, the present invention are described in detail on the basis of embodiments shown in the accompanying drawings.

First Embodiment

Figure 1:
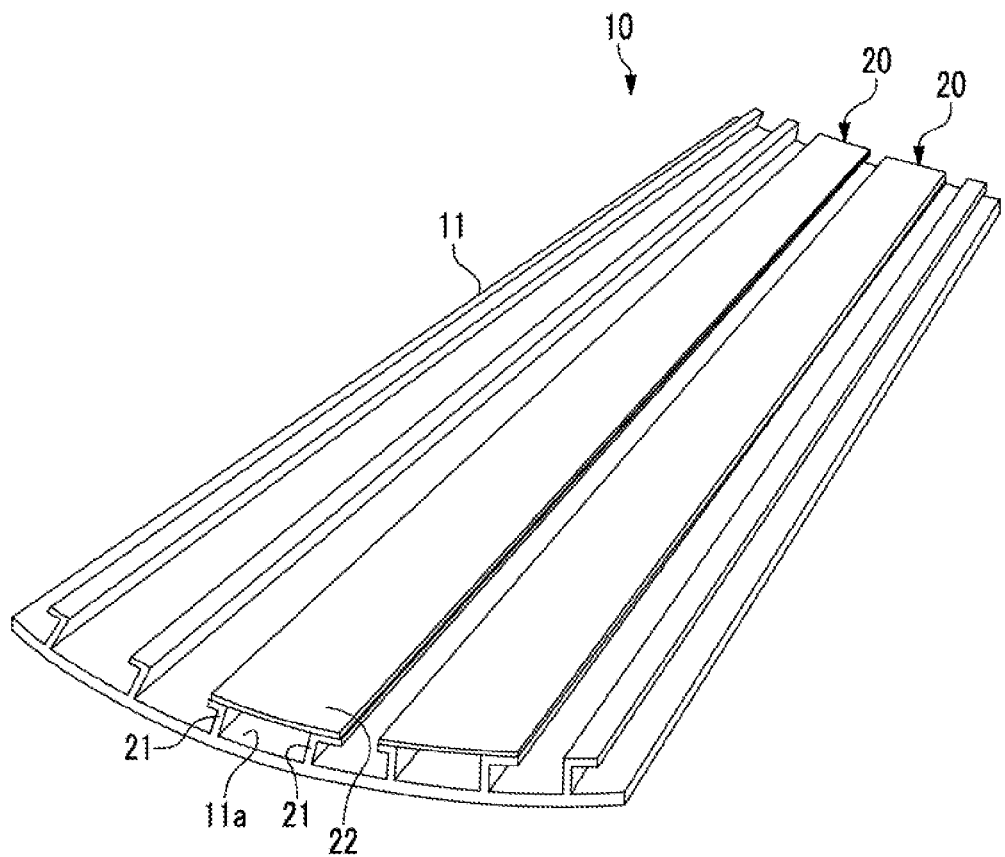
FIG. 1 is a perspective view showing a wing panel configuring a main wing for an aircraft in a first embodiment.

FIG. 1 is a perspective view showing a wing panel 11 configuring a main wing 10 for an aircraft in this embodiment.

As shown in FIG. 1, the main wing 10 is provided with the wing panel 11 which forms a wing surface (an outer surface) on the upper surface side thereof, and a vent stringer (a vent member) 20 provided in the main wing 10. The vent stringer 20 is provided adjacent to a fuel tank 30 provided in the main wing 10.

In addition, in this embodiment, the upper surface side of the main wing 10 is formed by a sheet of wing panel 11. However, the main wing 10 is not limited thereto, and two or more sheets of wing panels 11 may be combined.

The vent stringer 20 is provided continuously along a wingspan direction of the main wing 10 (a longitudinal direction of the wing panel 11) and a plurality of vent stringers 20 are provided parallel to each other.

Figure 2:
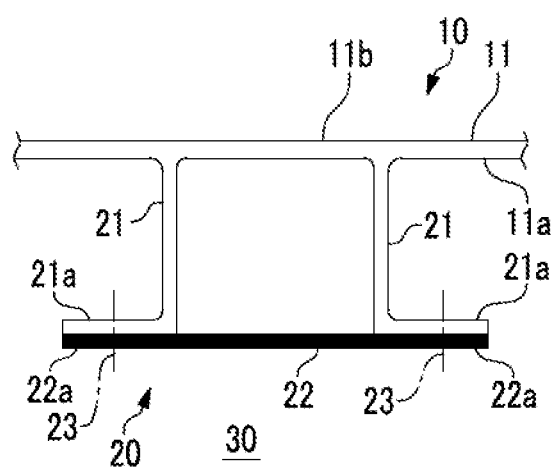
FIG. 2 is a cross-sectional view showing a vent stringer.

As shown in FIG. 2, the vent stringer 20 is formed to include a pair of ribs 21 and 21 rising in a direction orthogonal to an inner surface 11a of the wing panel 11, and a cover 22 provided on tip portions of the ribs 21 and 21.

Each rib 21 is formed so as to be continuous along the wingspan of the main wing 10. At the tip portion of each rib 21, a flange portion 21a extending toward the side opposite to the facing rib 21 is integrally formed. The rib 21 is formed integrally with the wing panel 11. That is, the wing panel 11 and the rib 21 are formed by performing cutting-out work from a metal matrix. The rib can function as a reinforcing element against the deformation in an out-of-plane direction of the wing panel 11.

Further, the cover 22 has a strip shape extending in the wingspan direction of the main wing 10. The cover 22 is provided so as to close a space between the ribs 21 and 21 by bringing both side end portions 22a and 22a thereof into contact with the flange portions 21a and 21a of the ribs 21.

Then, both side end portions 22a and 22a of the cover 22 and the flange portions 21a and 21a of the ribs are integrally fastened to each other by rivets (fastening members) 23 disposed at predetermined intervals.

The vent stringer 20 uses a space surrounded by the ribs 21 and 21, the cover 22, and the inner surface 11a of the wing panel 11 as a flow path for air introduced from the outside. Air is introduced from the outside into the fuel tank 30 through the vent stringer 20.

Figure 3:
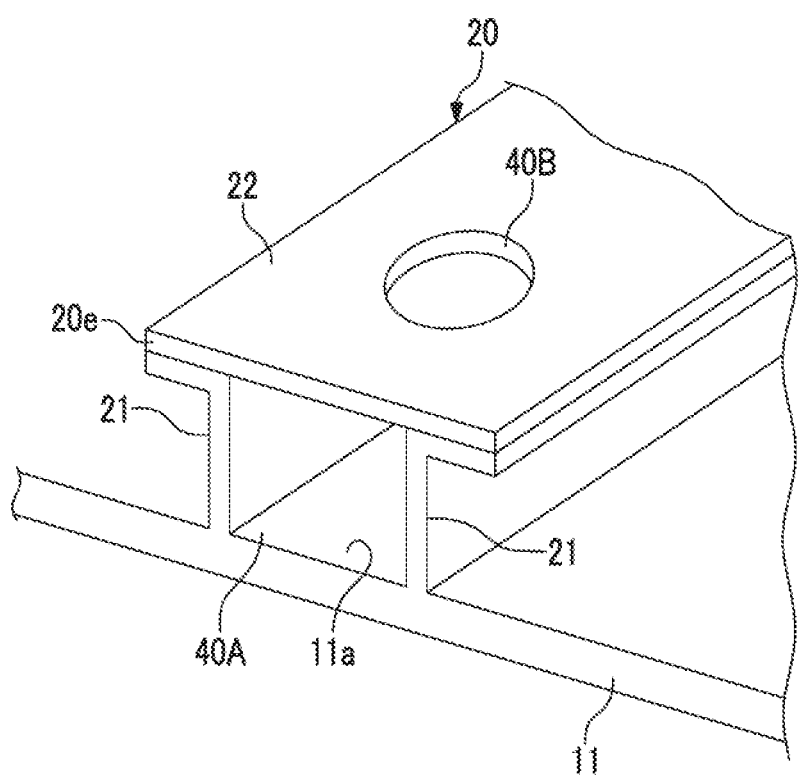
FIG. 3 is a perspective view showing a plurality of openings formed in the vent stringer.

As shown in FIG. 3, a plurality of opening portions 40A and 40B are formed on one end side of the vent stringer 20 in order to introduce air from the outside.

Here, the opening portion 40A is formed by an end portion of the space surrounded by the ribs 21 and 21, the cover 22, and the inner surface 11a of the wing panel 11, that is, a terminus surface 20e of the vent stringer 20, which becomes an opening end.

Further, the opening portion 40B is a hole of, for example, a round shape formed in the cover 22 in the vicinity of a terminus of the vent stringer 20.

According to such a configuration, since the plurality of opening portions 40A and 40B are formed in a single vent stringer 20, even in a case where one of the opening portions 40A and 40B is blocked, it is possible to secure ventilation by the other opening portion.

At this time, since the opening portions 40A and 40B are formed in surfaces different from each other in the vent stringer 20, a possibility that both the opening portions 40A and 40B may be simultaneously blocked is less, and thus it is possible to reliably exhibit the above-described effect.

Further, since the opening portion 40A can be formed by making the terminus surface 20e of the vent stringer 20 be an opening end and the opening portion 40B is formed simply by forming a hole in the cover 22, it is possible to easily form the respective opening portions 40A and 40B.

Incidentally, in the configuration as described above, since the rivet 23 is not exposed on an outer surface 11b of the wing panel 11, it is possible to prevent a spark from occurring in the fuel tank 30 provided in the interior of the main wing 10 through the rivet 23 at the time of lightning strikes.

Further, since the matching surfaces of the rib 21 and the cover 22 are also spaced inward from the outer surface 11b of the wing panel 11, even in a case where the rib 21 and the cover 22 are formed of materials different from each other, a spark does not easily occur.

In this way, it is possible to significantly improve lightning protection capability.

Further, since the work of fastening the rib 21 and the cover 22 by the rivet 23 can be performed on the inner surface 11a side of the wing panel 11, workability is excellent.

In addition, since the rib 21 is formed integrally with the wing panel 11 by cutting-out, the rib 21 is formed with a high degree of accuracy to fit a curved shape of the wing panel 11. On the other hand, since the cover 22 is provided only by bending a strip-shaped member to fit the shapes of the wing panel 11 and the rib 21, it is possible to reliably bring the cover 22 into contact with the tip portion of the rib 21. In particular, in a case where the cover 22 is a thin plate, since the cover 22 is easily deformed to follow the tip shape of the rib 21 by the fastening by the rivet 23, workability is more excellent.

Second Embodiment

Next, a second embodiment of the vent member and the main wing for an aircraft according to the present invention is described. In the following, since the configuration of the opening portion 40B formed in the cover 22 shown in the first embodiment described above is simply replaced with another configuration and the other configurations of the vent stringer 20 are common with the first embodiment described above, only a configuration different from that in the first embodiment is described, and the configurations common with the first embodiment are denoted by the same reference numerals in the drawing and description thereof is omitted.

Figure 4:
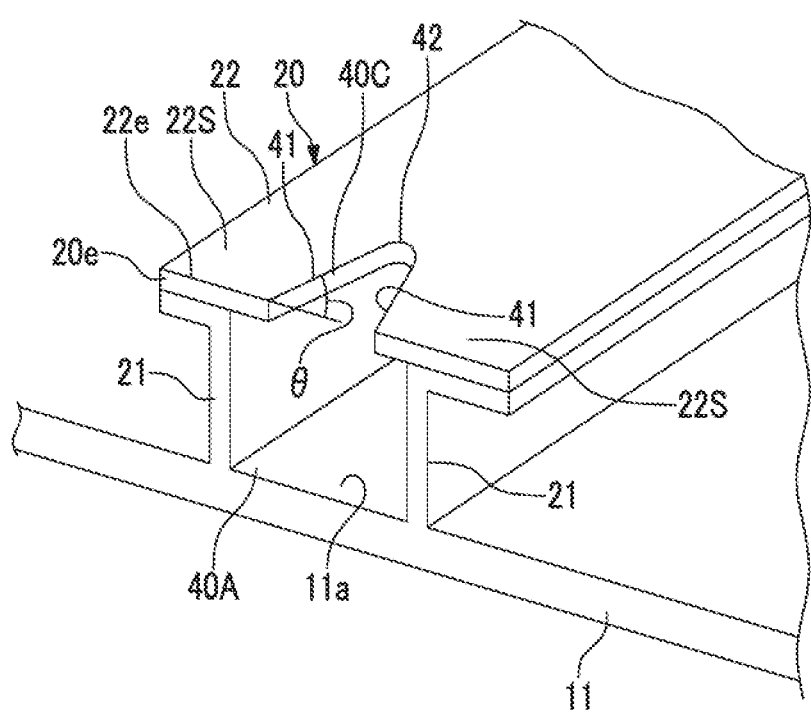
FIG. 4 is a perspective view showing a plurality of openings formed in a vent stringer in a second embodiment.

As shown in FIG. 4, a plurality of opening portions 40A and 40C are formed on one end side of the vent stringer 20 in order to introduce air from the outside.

The opening portion 40C is formed in the cover 22 in the vicinity of a terminus of the vent stringer 20. The opening portion 40C is an opening end in a terminus 22e of the cover 22. The opening portion 40C is formed such that an opening width in a width direction perpendicular to the longitudinal direction of the vent stringer 20 gradually increases toward the terminus surface 20e from the center side in the longitudinal direction of the vent stringer 20. The opening portion 40C can be formed into, for example, a semi-circular shape or a quadratic curved line shape when viewed from a direction orthogonal to the surface of the cover 22. Further, it is also possible to form the opening portion 40C into a shape having straight line portions 41 and 41 extending at a predetermined angle θ with respect to the terminus 22e of the cover 22 and a circular arc portion 42 connecting the straight line portions 41 and 41.

Here, it is preferable that the angle θ be in a range of 20° to 30°, for example.

According to such a configuration, since the plurality of opening portions 40A and 40C are formed in a single vent stringer 20, even in a case where one of the opening portions 40A and 40C is blocked, it is possible to secure ventilation by the other opening portion.

At this time, since the opening portions 40A and 40C are formed in surfaces different from each other in the vent stringer 20, a possibility that both the opening portions 40A and 40C may be simultaneously blocked is less, and thus it is possible to reliably exhibit the above-described effect.

Here, in the first embodiment described above, the opening portion 40B is formed into a circular shape. However, in such a configuration, when load acts on the vent stringer 20, stress concentration occurs on the terminus 22e side of the cover 22 in the opening portion 40B. In contrast, the opening portion 40C is formed as an opening end, as in the embodiment described above, whereby the cover 22 is made such that a cross-sectional area thereof is gradually reduced on both sides 22s and 22s of the opening portion 40C. In this way, when load acts on the vent stringer 20, it is possible to prevent stress concentration from occurring in the vicinity of the terminus 22e of the cover 22.

Modified Example of Second Embodiment

Figure 5:
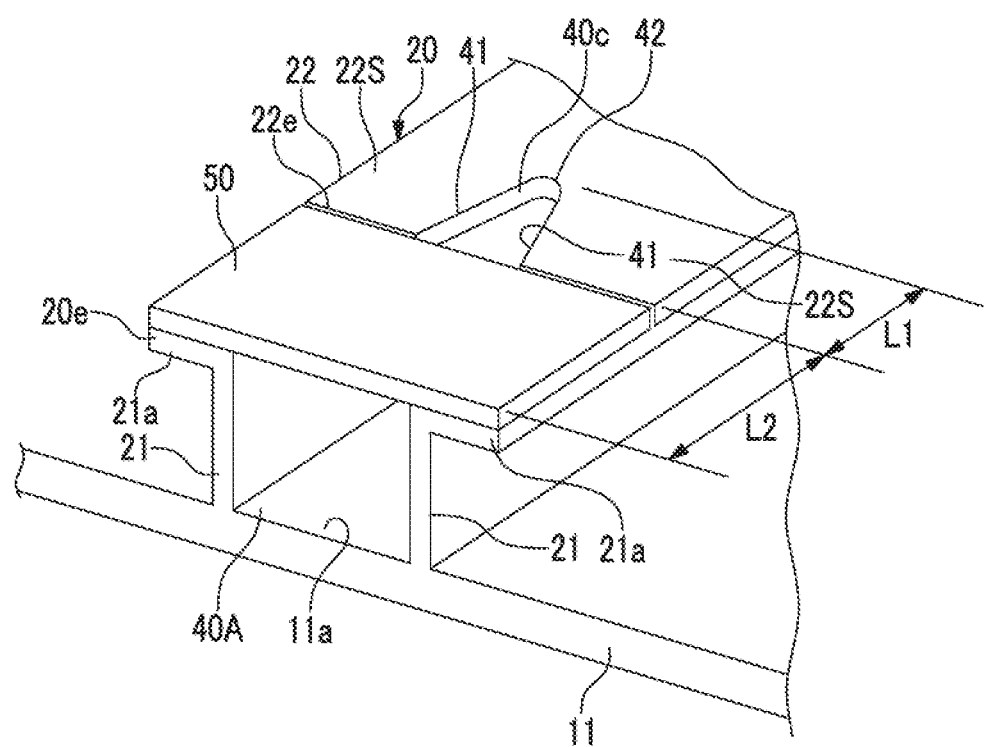
FIG. 5 is a perspective view showing a modified example of the plurality of openings formed in the vent stringer in the second embodiment.

In addition, in regard to the configuration shown in the second embodiment, an end plate 50 may be provided on the terminus side of the vent stringer 20, in proximity to the cover 22 in which the opening portion 40C that is an opening end is formed in the terminus 22e. As shown in FIG. 5, the end plate 50 has a rectangular shape and is provided to close the space between the ribs 21 and 21 by bringing both side end portions thereof into contact with the flange portions 21a and 21a of the ribs 21, similar to the cover 22.

Then, the opening portion 40A is formed by an end portion of the space surrounded by the end plate 50, the ribs 21 and 21, and the inner surface 11a of the wing panel 11, that is, the terminus surface 20e of the vent stringer 20, which is an opening end.

Here, it is preferable that an opening length L1 in the longitudinal direction of the vent stringer 20 in the opening portion 40C and a length L2 in the longitudinal direction of the vent stringer 20 in the end plate 50 be formed so as to be approximately equal to each other.

Even in such a configuration, the opening portion 40C is an opening end in the cover 22 and the cover 22 is made such that a cross-sectional area thereof is gradually reduced on both sides 22s and 22s of the opening portion 40C. In this way, when load acts on the vent stringer 20, it is possible to prevent stress concentration from occurring in the vicinity of the terminus 22e of the cover 22.

In addition, the end plate 50 is provided, whereby the opening portion 40A and the opening portion 40C are reliably separated from each other, and thus a possibility that both the opening portions 40A and 40C formed in surfaces different from each other in the vent stringer 20 may be simultaneously blocked is less.

In addition, in the second embodiment described above, as long as the opening portion 40C is formed as an opening end in the terminus 22e of the cover 22, the thickness of the cover 22 on both sides of the opening portion 40C may be gradually reduced toward the terminus surface 20e, rather than gradually increasing the opening width thereof.

In addition, in the first and second embodiments described above, a configuration is adopted in which the cover 22 is brought into contact with the flange portion 21a of the rib 21. However, other shapes and configurations are also possible. For example, a configuration is also possible in which the flange portion 21a is not formed at the rib 21, the cover 22 is formed so as to have an approximately U-shaped cross section in which rising portions each following the side surface of the rib 21 are formed at both ends of the cover 22, and the rising portion is fastened to the side surface of the rib 21.

Further, in the present invention, even in a case of a vent stringer configured by mounting an approximately U-shaped member on the inner surface 11a of the wing panel 11, or a case where a vent tube having a circular pipe shape is provided along the inner surface 11a of the wing panel 11, a configuration may be made in which the opening portions 40A, 40B, and 40C are formed at an end portion of the vent stringer or the vent tube in the same manner as described above.

In addition to this, it is possible to choose the configurations mentioned in the embodiments described above or appropriately change the configurations to other configurations without departing from the gist of the present invention.

REFERENCE SIGNS LIST

10: main wing
11: wing panel
11a: inner surface
20: vent stringer (vent member)
20e: terminus surface
21: rib
21a: flange portion
22: cover
22a: both side end portions
22e: terminus
22s: both sides
23: rivet
30: fuel tank
40A, 40B, 40C: opening portion
41: straight line portion
42: circular arc portion
50: end plate

The invention claimed is:

1. A vent member of an aircraft that is formed along an inner surface of a wing panel having an outer surface forming an outer surface of a wing and the inner surface facing an inside of the wing and is continuous in a longitudinal direction of the wing panel, the vent member being a fully enclosed conduit defining a flow path between opposite terminal ends that are open that conveys air between the opposite terminal ends, said fully enclosed conduit extending continuously in a longitudinal direction of the wing between the opposite terminal ends and comprising a first opening portion formed in close proximity to at least one of the terminal ends of the vent member such that a plurality of opening portions are formed at one end of the vent member, wherein the fully enclosed flow path extending between the opposite terminal ends is defined by a pair of ribs extending upwardly from the inner surface of the wing panel and a separate cover arranged to close a space between tip portions of the ribs, the pair of ribs is formed integrally with the wing panel on the inner surface of the wing panel and is continuous in the longitudinal direction of the wing panel and the opening portion formed in close proximity to at least one of the terminal ends of the vent member is provided in the separate cover facing the inner surface of the wing panel.

2. The vent member according to claim 1, wherein the plurality of opening portions are formed in surfaces different from each other in the vent member.

3. The vent member according to claim 1, wherein the cover is coupled to the tip portions of the ribs by a fastener.

4. The vent member according to claim 1, wherein the first opening portion is formed so as to be an opening end in an end portion of the cover and is formed such that a cross-sectional area of the cover on both sides of the first opening portion is gradually reduced toward a terminus of the cover.

5. The vent member according to claim 4, further comprising;
an end plate provided in proximity to the terminus of the cover so as to close the space between the tip portions of the pair of ribs.

6. The vent member according to claim 3, wherein the wing panel is formed from a metal matrix, and the ribs are integrally formed with the wing panel by being cut out from the same metal matrix as the wing panel.

7. The vent member according to claim 1,
wherein the pair of ribs are formed integrally with the wing panel on the inner surface of the wing panel and is continuous in a longitudinal direction of the wing panel.

8. The vent member according to claim 7, wherein the plurality of opening portions are formed in surfaces different from each other in the vent member.

9. The vent member according to claim 1, wherein the wing panel is part of a main wing for the aircraft.

10. The vent member according to claim 1, wherein a central region of the vent member is devoid of the opening portions, and all of the opening portions provided to the vent member are formed closer to the terminal ends of the cover than the central region.

11. The vent member according to claim 1, wherein the ribs, the cover and the inner surface of the wing collectively define an opening portion at each of the terminal ends of the enclosed flow path to convey air between the opening portion at each of the terminal ends.

12. The vent member according to claim 1, wherein at least one of the plurality of opening portions is formed in a side wall of the vent member and another of the plurality of opening portions is formed in one of an adjacent side wall or an opposite side wall of the vent member.

* * * * *

UNITED STATES PATENT AND TRADEMARK OFFICE
CERTIFICATE OF CORRECTION

PATENT NO. : 9,926,082 B2
APPLICATION NO. : 14/353951
DATED : March 27, 2018
INVENTOR(S) : Ushio Komoda et al.

Page 1 of 1

It is certified that error appears in the above-identified patent and that said Letters Patent is hereby corrected as shown below:

In the Specification

Column 4, Line 11, "The rib can" should be -- The rib 21 can --.

Column 4, Line 20, "the ribs are" should be -- the ribs 21 are --.

Signed and Sealed this
Third Day of July, 2018

Andrei Iancu
*Director of the United States Patent and Trademark Office*